Aug. 16, 1949.
G. C. RUSSELL
2,479,515
DRILL PRESS
Filed Oct. 10, 1945
2 Sheets-Sheet 1
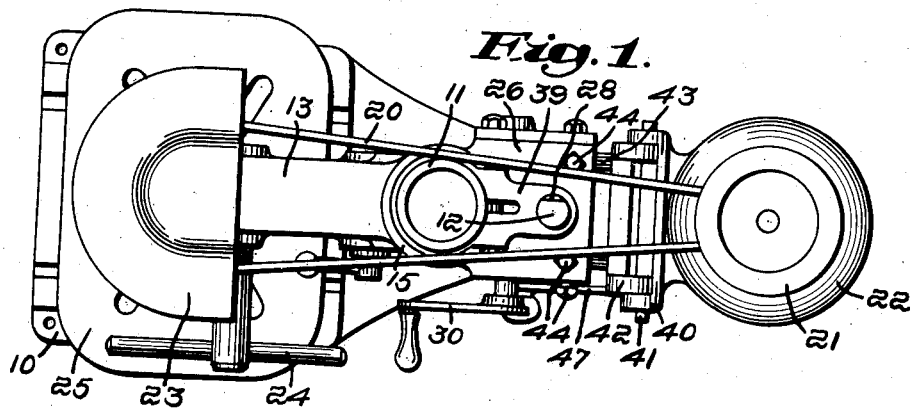
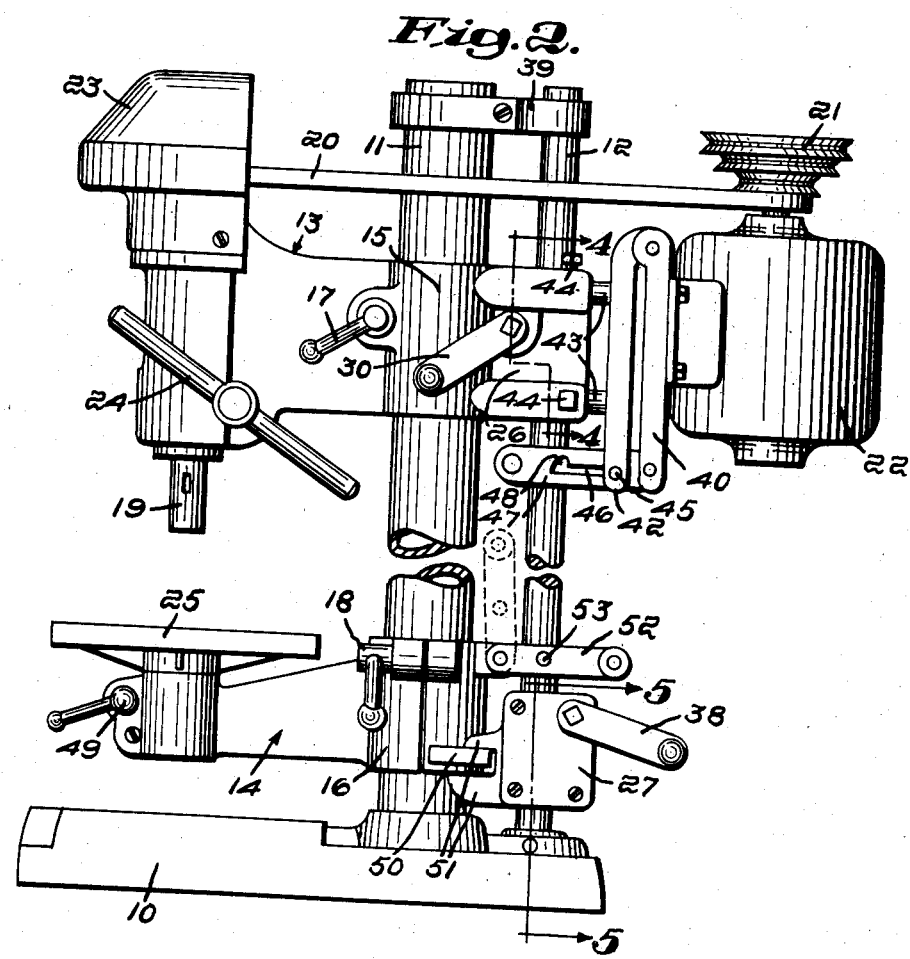
Inventor:
Grover C. Russell,
by Spear & Spear
Attorneys Aug. 16, 1949.  G. C. RUSSELL  2,479,515
DRILL PRESS
Filed Oct. 10, 1945
2 Sheets-Sheet 2
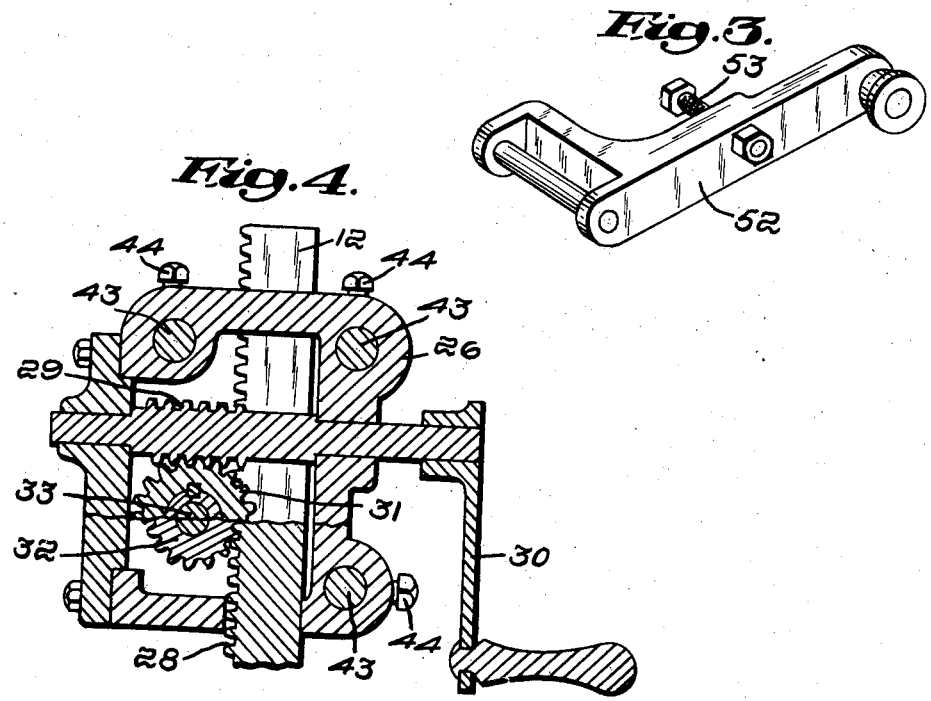
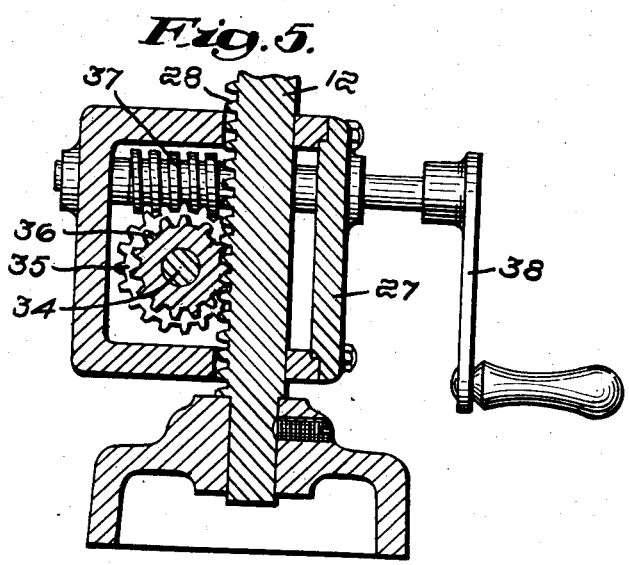
Inventor:
Grover C. Russell,
by Spear & Spear
Attorneys Patented Aug. 16, 1949

2,479,515

UNITED STATES PATENT OFFICE 2,479,515

DRILL PRESS

Grover C. Russell, Needham, Mass.

Application October 10, 1945, Serial No. 621,464

3 Claims. (Cl. 77—63)

This invention relates to improvements in drill presses and particularly to drill presses having means by which the drill head units and the table units may be independently adjusted on their supporting posts or columns with mechanical advantage.

In all drill presses, where the drill head units and the table units are clamped to their supporting posts, by releasing the clamping means, the units may be adjusted as desired. Such adjustments are difficult to effect, particularly where a drill head unit includes a motor especially in the case of women or juvenile operators. This difficulty has been recognized and certain proposals have been made to provide means whereby the units may be raised or lowered along their post with mechanical advantage.

A drill press in accordance with my invention has first and second posts. The first post slidably supports the drill head unit and the table unit. Each unit has a clamp by which it may be locked to the first post and crank controlled pinion means meshing with a rack surface on the second post. The upper ends of the posts are interconnected to ensure rigidity and the table unit may conveniently be mounted to swing about the first post into a position determined by an adjustable stop engaging with the second post. The table itself, is specially designed to permit its rotary adjustment while providing the recognized advantages of generally rectangular or square shape.

These features, together with a hinged motor with a latch for holding it in a tilted position to release the tension on the belt when making speed changes of the belt or the pulleys, contribute to make drill presses in accordance with my invention of sturdy construction and easy to adjust with the crank controlled means of each unit being readily accessible to ensure maximum convenience to the operator.

In the accompanying drawings, I have shown an illustrative embodiment of my invention from which its several novel features and advantages will be readily apparent. In the drawings:

Fig. 1 is a plan view of a drill press in accordance with my invention.

Fig. 2 is a side elevation of the drill press of Fig. 1 partly broken away to shorten the figure length.

Fig. 3 is a view of the adjustable stop by which swinging of the work table is limited.

Fig. 4 is a section, on an enlarged scale, along the lines 4—4, of Fig. 2, and

Fig. 5 is a somewhat similar view along the lines 5—5, of Fig. 2.

In the embodiment of my invention shown in the drawings, I have indicated at 10 a base which supports vertically disposed posts or columns 11 and 12.

At 13 and 14, respectively, I have indicated generally the drill head unit and the table unit. The units 13 and 14 have clamping hubs 15 and 16, respectively, controlled by conventional clamping means 17 and 18 so that the units may be slidably supported by the post 11 and locked thereto in any desired position by setting up the clamping means.

I have not detailed the construction of the drill head unit but have indicated a spindle 19, a belt drive 20 connecting the pulley 21 driven by the motor 22 and the spindle rotating pulley concealed by the removable cover 23. The hand bar 24 is conventional and is actuated to advance a rotating drill against work supported on the table 25 of the table unit 14.

The units 13 and 14 have housings 26 and 27, respectively, and these are apertured to receive the post 12. The posts 11 and 12 are in alinement with the spindle 19 and the post 12 has a rack surface 28 disposed at one side of a plane inclusive of the posts. As may be seen in Fig. 4, the housing 26 supports a worm 29 rotated by a crank 30 and meshing with a worm gear 31 to which is connected a pinion 32 rotatably supported by the housing 26. The pinion 32 meshes with the rack surface 28. The worm gear 31 and the pinion 32 are fast on a shaft 33. As shown in Fig. 5, I mount in the housing 27 a shaft 34 for the worm gear 35 and the pinion 36 connected thereto. The worm gear 35 meshes with the worm 37 rotatable with the crank 38. The pinion 36 meshes with the rack surface 28. Preferably, the cranks 30 and 38 are located on the right side of my drill press for maximum convenience in adjusting the relation of the units to each other or to the base 10.

I interconnect the upper ends of the posts 11 and 12 as at 39 to ensure that the post 12 remains rigid when either clamping means 17, 18 are released and either crank 30, 38 operated to raise or lower either of the units.

I have shown the motor 22 as mounted on a plate 40 hinged as at 41 to a plate 42 fast on rods 43 anchored in the housing 26 by set screws 44. The plate 42 has a stud 45 extending through a slot 46 in an arm 47 pivotally carried by the plate 40. I form one end of the slot 46 with a pocket 48 which enables the motor 22 to be latched in a tilted position as when a belt 20 is being replaced or shifted on the pulleys.

My table 25 is rotatably mounted on its unit 14 and is held in desired position by clamping means 49. The table 25 is preferably rectangular and has rounded corners. The maximum distance from the center of the table to any corner is less than the distance from that center to the post 11 so that the table 25 may be turned relative to the unit 14 and locked in any selected position.

While the housing 27 may be rigidly connected to the unit 14 or to an integral part thereof, I prefer to provide a connection therebetween so that the table 25 may be swung relative to the post 11 and still permit the operator to be able to raise and lower the table unit 14 by actuating the crank 38 when the clamping means 18 are released. This connection may conveniently consist of a flange 50 on the hub 16 disposed between jaws 51 on the housing 27. At 52, I have shown an adjustable stop hinged to the unit 14 for movement between its dotted line position of Fig. 2 in which maximum rotation of the unit 14 is permitted, and its full line position in which it engages the post 12. The stop 52 has a set screw 53 by which adjustments are made in the extent to which the unit 14 may be swung.

From the foregoing, it will be apparent that drill presses in accordance with my invention provide adaptability to a wide range of conditions as well as making it provide for the units to be independently adjusted with maximum ease and convenience.

What I therefore claim and desire to secure by Letters Patent is:

1. In a drill press, a first post, a second post rearwardly of said first post and having a rack surface, a unit slidably supported by said first post, means to lock said unit to said first post, said unit including a housing slidably supported by said second post, and crank controlled pinion means supported in said housing in mesh with said rack surface to enable said unit to be raised and lowered with mechanical advantage when said locking means are released.

2. In a drill press, a first post, a second post rearwardly of said first post and having a rack surface, a table unit slidably supported by said first post, means to lock said unit to said first post, a housing slidably supported by said second post, a crank controlled pinion means in said housing in mesh with said rack surface to enable said housing to be raised and lowered with mechanical advantage, and said housing and said unit including coacting jaw and flange portions to enable said unit to be turned with said first post as its axis and to be raised or lowered with said housing when said lock means are released.

3. The drill press of claim 2 and a stop hinged to the unit for movement between a position in which it engages the second post and a position in which the turning of the unit is unblocked.

GROVER C. RUSSELL.

REFERENCES CITED

The following references are of record in the file of this patent:

UNITED STATES PATENTS

| Number | Name | Date |
| --- | --- | --- |
| 1,135,767 | Cheshire | Apr. 13, 1915 |
| 1,426,496 | Norris | Aug. 22, 1922 |
| 2,122,966 | Tautz | July 5, 1938 |
| 2,123,337 | Kosman et al. | July 12, 1938 |
| 2,154,745 | Hedgpeth | Apr. 18, 1939 |

FOREIGN PATENTS

| Number | Country | Date |
| --- | --- | --- |
| 22,014 | Great Britain | Dec. 16, 1891 |